Jan. 7, 1941.  M. POLIVKA  2,227,842
GLASS STRUCTURE
Filed Dec. 22, 1938  2 Sheets-Sheet 1
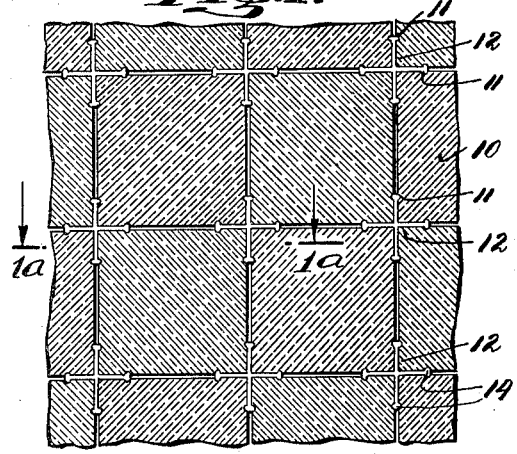
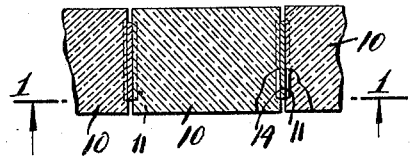
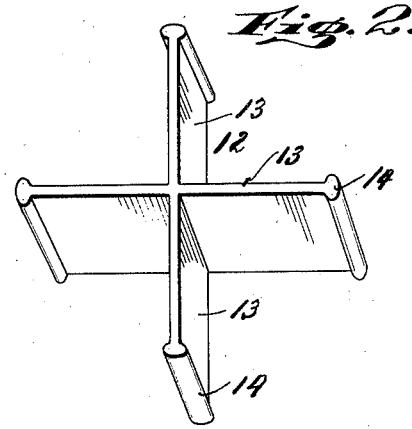
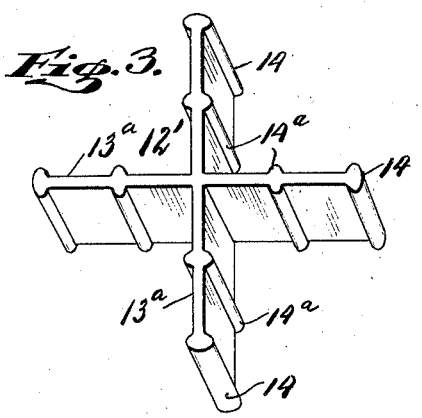
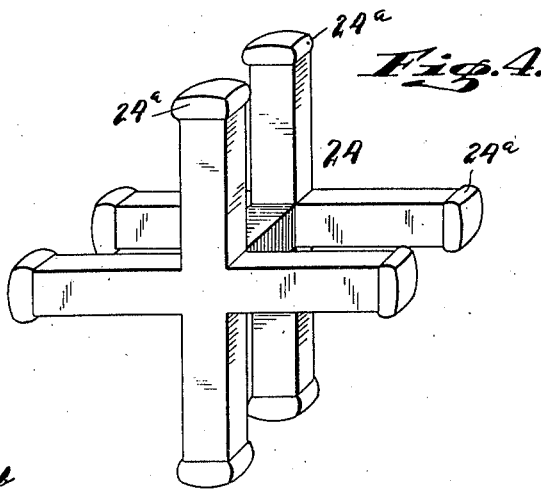
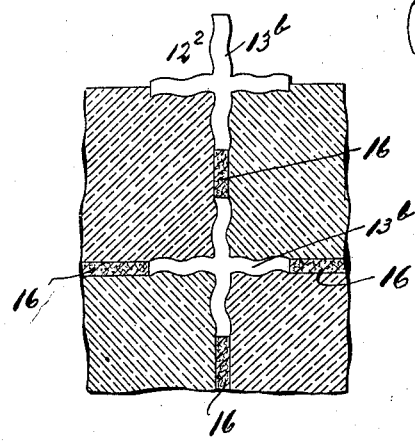
INVENTOR
Milos Polivka
BY
ATTORNEY Jan. 7, 1941.                M. POLIVKA                    2,227,842
                           GLASS STRUCTURE
                       Filed Dec. 22, 1938            2 Sheets-Sheet 2
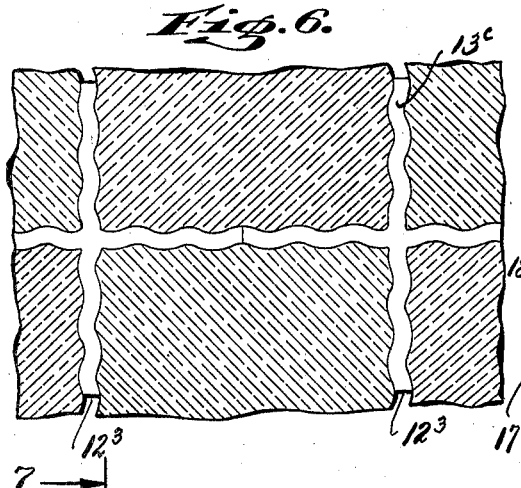
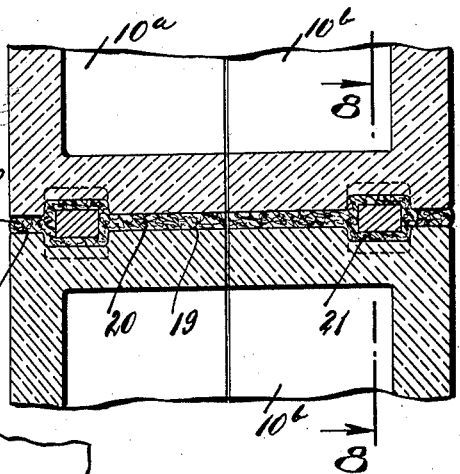
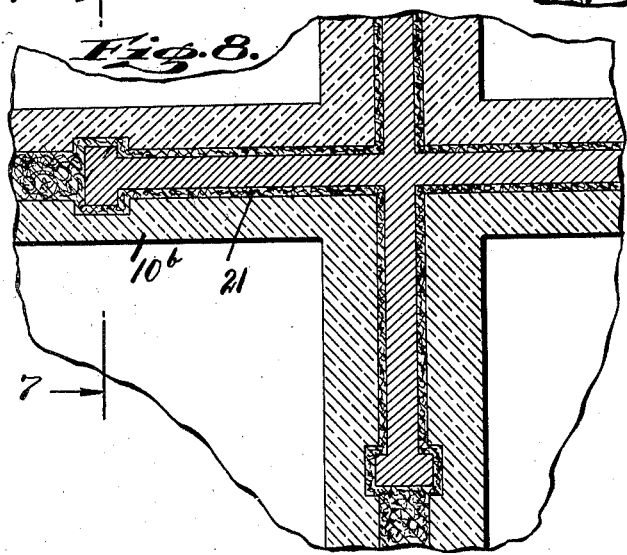
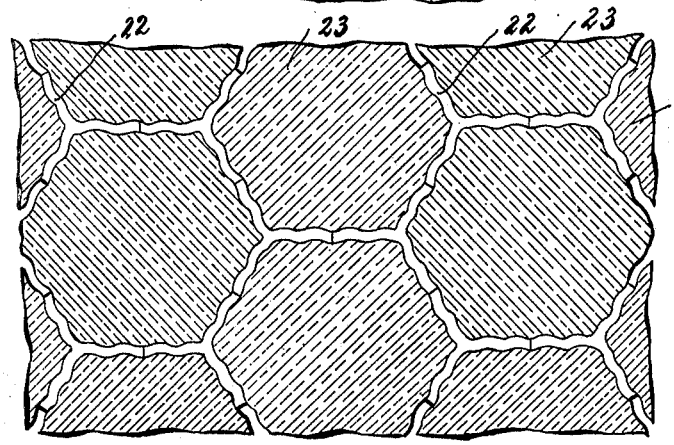
INVENTOR
Milos Polivka
BY
ATTORNEY Patented Jan. 7, 1941

2,227,842

UNITED STATES PATENT OFFICE 2,227,842

GLASS STRUCTURE

Milos Polivka, New York, N. Y.

Application December 22, 1938, Serial No. 247,155

9 Claims. (Cl. 72—40)

This invention relates to glass structures and more particularly to the so-called glass bricks or blocks and to a novel method of joining or anchoring adjacent bricks together in building glass structures, such as walls or the like.

The main object of this invention is to provide a method and means whereby the outstanding properties of glass material, such as its extraordinary compressive and tensile strength and light transmission can be utilized to a better advantage than this has been hitherto possible, and enable the building of glass structures in a simple and more economical manner.

The high compressive strength of glass which is used for glass bricks runs from about 70,000 to 90,000 pounds per square inch, and its comparatively high tensile strength from about 7000 to 9000 pounds per square inch, as is well known. Nevertheless in glass construction work cement or lime mortar has been hitherto used as binding medium between the individual glass bricks, which medium is of comparatively low compressive and tensile strengths, frequently amounting to only one-tenth or less of those of glass. Frequently this mortar receives steel reinforcements (bars or wires) to be capable of resisting strong pressures such as winds or loads. It is, however, a fact that the structure produced by such method necessarily has the tensile strength only of said binding material. Concrete as building material has in recent years acquired an important status in construction work, due to the recognition that to increase its tensile strength steel reinforcements have to be used, whose tensile and compressive strengths are so much superior to concrete, so that the final product, steel reinforced concrete, has acquired the extraordinary properties required for strong structures, such as long span bridges, halls, or the like.

But the employment of any such material as binder, whether mortar alone or in combination with steel reinforcements in glass construction work, has another vital disadvantage, namely, that by its use light transmission is greatly reduced. The principal reason for substituting glass for other building material is its ability of transmission of light. Now it is known that by using ordinary mortar for binding glass bricks, of for example 7¾ x 4¾ x 1⅞ inches size and spaced ¼ inch apart, about five (5%) per cent of light transmission is lost, and that by using concrete with steel reinforcements spaced two inches apart, twenty-two (22%) per cent light transmission is lost.

By the present invention the use of any binding material, such as cement, lime or concrete, is entirely eliminated and the loss of light transmission is reduced to only 2½%.

One of the principal advantages of my invention resides in that the tension exerted on the joints of the completed glass structure is directly taken up by the glass blocks.

Another advantage is that the construction work can be performed in any kind of weather and under different temperatures, while when cement or other binding mortar or the like is used the work can be done only in dry weather or at temperatures above the freezing point.

To accomplish my object I employ comparatively thin joint elements, preferably of metal, which are adapted to be inserted between groups of adjoining glass bricks and are to join or anchor the latter in an effective manner, directly taking up and distributing the forces arising in the completed glass structure. For extraordinary loads where glass bricks are made of larger thickness, thicker metal joints may be used.

My invention will be more fully understood by reference to the accompanying drawings in which similar reference characters denote the corresponding parts and in which Figure 1 is a vertical section of a completed glass wall structure built according to my invention;

Figure 1ª is a cross section on line 1ª—1ª of Figure 1;

Figures 2, 3 and 4 are perspective views of modified forms of an individual anchoring element;

Figure 5 is a similar section to Figure 1 showing a partial glass structure with modified anchoring elements and the spaces between opposite arms of adjacent elements filled with some packing material;

Figure 6 is another similar section to Figure 1 showing the opposite arms of the adjacent anchoring elements abutting against one another;

Figure 7 is a vertical section on line 7—7 of Figure 8 showing adjacent glass blocks joined together by my new anchoring elements; and Figure 8 is a cross section on line 8—8 of Figure 7.

Figure 9 is a vertical section similar to Figure 1 of a modified structure.

In the embodiment in Figure 1 the glass structure by way of example is shown as a wall of a building. This wall is composed of individual glass blocks or bricks 10 manufactured in the usual manner and usually of rectangular shape, either hollow or solid, and each cast either as a whole piece or in half sections suitably united to an integral piece. In case of a wall the blocks are laid side by side in horizontal rows stacked vertically upon one another, so that the edges of adjoining blocks of each horizontal row are in vertical alignment with those of every other horizontal row throughout the entire wall structure. Each block 10 is provided in each of its circumferential surfaces with one or more cavities or recesses 11 extending longitudinally of said surfaces.

As hereinabove stated, these blocks are adapted to be united with one another not by any binding material such as mortar or the like, hitherto used for this purpose, but by anchoring elements 12 forming the subject of this invention. These elements are preferably made of steel or other suitable strong material and are so constructed and shaped as to be capable of each uniting several blocks of an adjoining group. According to the embodiment shown in Figures 1 and 2 each anchoring element 12 consists of a relatively thin cross shaped member whose cross arms 13 extend at a right angle to one another and at their free ends are formed with enlargements or bosses 14. In width each cross member is slightly smaller than the thickness of an individual block 10. When laying the glass blocks such cross elements are placed in the interstices between adjoining glass blocks, one for a group of four, with their arms extending through said interstices and their bosses engaging the crevices or recesses 11 of said blocks, whereby the blocks become effectively united or anchored to one another. The end blocks of the glass wall thus erected may be anchored to the opposite brick walls, ceiling, etc. of the building in a similar manner by the cross members 12 whose beaded arms 13 may engage correspondingly shaped grooves provided therein.

In the modification of Figure 3 the arms 13a of the cross members 12' are provided not only with bosses 14 at their ends, but also with auxiliary intermediate bosses 14a.

Instead of arms formed with enlargements or bosses, the arms 13b of the cross members 12² may be waved or undulated, as shown in the modifications of Figures 5 and 6, to engage correspondingly shaped grooves in the glass block.

In Figure 5 the arms 13b of the cross member 12² are relatively short and the interstices between opposite arms of two of adjacent crosses may be filled out with some packing or tightening material 16.

In the modification shown in Figure 6 the arms 13c of the cross members 12³ are extended to half the width of a block so that the ends of opposite arms of adjacent cross members will abut against one another.

In the modification of Figure 7 glass blocks are shown, each made of two hollowed half sections 10a, 10b suitably fused or otherwise joined in well known manner to a single block. Each half of one sectional block is joined or anchored to the corresponding half of an adjoining block through my new cross members of any of the forms shown.

The externally exposed portions of the interstices 17 between the adjoining blocks are adapted to be filled with some suitable elastic waterproof material 18. The intermediate interstices 19 may be filled with some suitable packing or tightening material 20. The arms and their bosses of these members may be covered with a layer of elastic material, such as glass fibre, as shown at 21 in Figures 7 and 8.

The packing material 20 may be applied to the glass block either at the time the blocks are laid or in the manufacture thereof and may consist of elastic bands or strips (not shown) stretched around the circumference of the block and so admeasured in thickness that when the blocks are laid the said bands or strips are compressed and produce the desired tightening.

In the modification shown in Figure 9 the anchoring elements 22 are shown in form of undulated three armed elements which are adapted to engage correspondingly shaped grooves in the edges of a group of three adjacent glass blocks. The blocks 23 in this modification are shown hexagonal, which may be designed for dome or vault structures.

The members forming joints may be in form of a centrally connected double cross 24, as shown in Figure 4, each having beads or bosses 24a to engage corresponding cavities in the circumferential surfaces of the stone blocks.

Since various other modifications may be made in the construction of the joint without departing from the principle of my invention I do not wish to restrict myself to the details of the construction described and shown.

What I claim is:

1. A glass wall composed of individual glass blocks recessed in each of their circumferential surfaces, and multiarmed anchoring elements, each having arms located in planes angularly disposed relative to one another, said elements being adapted to be mounted near the intersections of each group of adjacent blocks with their arms extending through the interstices between adjacent blocks, and means on said arms to engage the recesses of said blocks and bond them together to form a monolithic structure.

2. In a glass structure according to claim 1, in which the arms of each element are formed with enlargements serving as anchoring means when engaging the recesses in said blocks.

3. In a glass structure according to claim 1, in which the arms of said elements are arranged in the form of a cross.

4. In a glass structure according to claim 1, in which said recesses are waved or undulated and the protuberances are formed by corresponding shaping of said arms.

5. In a glass structure according to claim 1, in which the arms of said elements are covered with elastic layers.

6. In a glass structure according to claim 1, in which the interstices between the opposite arms of adjoining elements are filled with packing or tightening material.

7. In a glass structure according to claim 1, in which the arms of the anchoring elements are each of a length equal to half the width of a glass block.

8. In a glass structure according to claim 1, in which the externally exposed interstices between adjoining blocks are filled with waterproof elastic material.

9. A translucent structure of the character described composed of individual translucent polygonal members recessed in their circumferential surfaces and multiarmed joints whose arms radiate from a centre in different planes and have projections and which are adapted to be mounted between adjoining members, so that their arms extend through the interstices between said blocks and their projections engage said cavities, thereby anchoring said members together.

MILOS POLIVKA.